(12) United States Patent
Feigen

(10) Patent No.: US 6,429,813 B2
(45) Date of Patent: *Aug. 6, 2002

(54) METHOD AND SYSTEM FOR PROVIDING END-USER PREFERENCES WITH A NAVIGATION SYSTEM

(75) Inventor: Jerry S. Feigen, Chicago, IL (US)

(73) Assignee: Navigation Technologies Corp., Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,882

(22) Filed: Jan. 14, 1999

(51) Int. Cl.[7] ............................................. H04B 7/185
(52) U.S. Cl. .................................. 342/357.13; 701/208
(58) Field of Search ........................... 342/457, 357.13; 701/208

(56) References Cited

U.S. PATENT DOCUMENTS

| | | | |
|---|---|---|---|
| 5,072,395 A | | 12/1991 | Bliss et al. ................. 364/443 |
| 5,559,707 A | * | 9/1996 | DeLorme et al. |
| 5,819,200 A | | 10/1998 | Tamai et al. ................. 701/208 |
| 6,038,508 A | | 3/2000 | Maekawa et al. |
| 6,088,649 A | | 7/2000 | Kadaba et al. |

* cited by examiner

Primary Examiner—Theodore M. Blum

(74) Attorney, Agent, or Firm—Frank J. Kozak; Jon D. Shutter

(57) ABSTRACT

A system and method are disclosed that make a navigation system easier to use. According to one aspect of the disclosed system and method, an end-user is permitted to define at least one preferred cities list. The cities included on the preferred cities list are selected by the end-user from all the available cities that are represented in the geographic database used by the navigation system. Thereafter, when the preferred cities list is in use and the end-user operates the navigation system to provide a function that requires that the end-user make a selection of a city, the end-user is presented with a list of the cities from the preferred cities list instead of all the available cities represented in the geographic database used by the navigation system. The preferred cities list is not restricted to cities, but may also include any kinds of places or administrative areas. According to another aspect of the disclosed system and method, the end-user can define a preferred cities list using a graphical image representation of a geographic area. The end-user defines the boundaries of a shape overlaid on the graphical image representation of a geographic area. Each city or administrative area any part of which is encompassed within the geographic boundaries corresponding to the shape drawn on the graphical image representation is included in a preferred cities list. According to yet another aspect of the disclosed system and method, the end-user defines a preferred area that is not restricted to city boundaries. The end-user defines the boundaries of a shape overlaid on the graphical image representation of a geographic area. Thereafter, when the preferred area is used and the end-user operates the navigation system to provide a function, the function is limited to only those places, locations, and so on, that are within the geographic area corresponding to the defined shape.

21 Claims, 10 Drawing Sheets

METHOD AND SYSTEM FOR PROVIDING END-USER PREFERENCES WITH A NAVIGATION SYSTEM

BACKGROUND OF THE INVENTION

The present invention relates to computer-based navigation systems and navigation programming, and more particularly the present invention relates to an improved and novel navigation system feature that allows an end-user to define personalized lists that are then used when operating the navigation system.

In-vehicle navigation systems provide a variety of useful navigation functions and features to end-users (i.e., the drivers and/or passengers of the motor vehicles in which the navigation systems are installed). Included among the functions that are provided by some navigation systems are route calculation and route guidance. The route calculation function determines a route to a desired destination location from a given starting location. The route guidance function provides maneuvering instructions for the end-user to follow to drive his/her vehicle to the desired destination location along the route calculated by the route calculation function. When using these functions, the end-user may be required to indicate a desired destination to the navigation system.

In-vehicle navigation systems provide various ways by which an end-user can indicate a desired destination. One way that the end-user can indicate a desired destination is to specify a street address. When used in this manner, the end-user may be required to identify the city in which the destination is located. To facilitate identification of a city by the end-user, some navigation systems present a list of available cities that are located in the geographic area represented by the database used by the navigation system. This list of cities may be presented on a display screen of the navigation system.

Operation of a conventional navigation system is described in connection with FIG. 1. FIG. 1 shows a display 100 of a conventional navigation system 110 showing a list 112 of cities. A message 120 on the display 100 requests the end-user to make a selection of one of the cities. One of the cities on the display screen 100 is highlighted to indicate a potential selection. In the example of FIG. 1, the highlighting is provided by a rectangular box 122, although in alternative embodiments the highlighting may be provided by any other suitable means. The cities listed on the display screen 100 in FIG. 1 are in alphabetical order. Alternatively, the city names listed on the display screen 100 may be in some other order, such as those cities that had been most recently selected as destinations.

The geographic database used by an in-vehicle navigation system may relate to an entire metropolitan area, such as the Chicago metropolitan area, the Los Angeles metropolitan area, and so on. Alternatively, the geographic database may relate to an entire state or even an entire country. Thus, the area covered by the geographic database used by a navigation system may include hundreds of cities. Accordingly, the cities shown in the display screen 100 in FIG. 1 are only a partial list of all the cities included in the geographic database used by the navigation system 110. In order to view additional cities on the display screen 100, the end-user operates controls on an input panel 116 of the navigation system 110. It may be necessary for the end-user to scroll through several screens of information to get to the city to include in the address of the desired destination.

In addition to selecting a city, the end-user may also be prompted to select a street and enter a street address. A menu screen similar to the screen shown on the display 100 of FIG. 1 may be provided to the end-user for selection of a street.

Some navigation system allow an end-user to select a desired destination city by prompting the end-user to spell the name of the city using keys on the input panel 116. Some of these navigation systems facilitate this process by prompting the end-user to enter the first few characters of the name of the desired destination city, displaying an alphabetical listing of all the city names that match the characters entered, and then, as each additional character is entered by the end-user, redisplaying an alphabetical listing of all the city names that match the characters entered until the end-user selects a name of a city from the displayed list.

Using navigation systems in the ways described above to select destinations is convenient for many situations. However, there may be occasions when the end-user does not know the street address of the destination. Also, there may be occasions when the end-user does not know the spelling of the name of the destination city. Accordingly, some navigation systems provide other ways to indicate desired destinations.

In some navigation systems, another way that an end-user can indicate a desired destination is to first use the navigation system to search for destinations of a particular type, and then after obtaining the results of this initial search, selecting one of the locations included in the search results and requesting that a route be calculated to the selected location. When using a navigation system to search for destinations of a particular type, a search area can be defined geographically (e.g., within 3 miles of a present vehicle position), or alternatively, the search area can be defined by city (e.g., Chicago, Oak Park, Evanston, and so on). When the search area is defined by city, a menu screen like the one shown in FIG. 1 may be presented to the end-user.

Using a navigation system in this manner is also convenient for many situations. However, there may be occasions when still other ways of using the navigation system may be desired. For example, the end-user may not know the name of the city or cities in which to search. Also, a covered geographic area may include many cities thereby requiring scrolling through several screens like the one shown in FIG. 1 to find the desired city. Also, when the navigation system is used to search for destinations of a specified type in a large city, there may be so many matches to the search request that the search results are difficult to use.

Accordingly, a need exists to provide additional ways to use a navigation system for searching. Moreover, this need may become greater as the amount of information included in geographic databases used by navigation systems continues to increase in scope and detail.

Another consideration relates to making navigation systems easy to use. Navigation systems, in particular systems installed in vehicles, make useful information and services available to the end-user in a manner that is not distracting to a person while driving a vehicle. Therefore, improved programming capabilities that can make a navigation system easier to use can be particularly useful.

SUMMARY OF THE INVENTION

To address these and other objectives, the present invention comprises a system and method that make a navigation system easier to use. According to one aspect of the disclosed system and method, an end-user is permitted to define at least one preferred cities list. The names of cities included on the preferred cities list are selected by the end-user from all the available cities that are represented in the geographic database used by the navigation system. Thereafter, when the preferred cities list is in use and the end-user operates the navigation system to provide a function that requires that the end-user make a selection of a city, the end-user is presented with a list of the cities from the preferred cities list instead of all the available cities represented in the geographic database used by the navigation system. The preferred cities list is not restricted to cities, but may also include any kinds of places or administrative areas.

According to another aspect of the disclosed system and method, the end-user can define a preferred cities list using a graphical image representation of a geographic area. The end-user defines the boundaries of a shape overlaid on the graphical image representation of a geographic area. Each city or administrative area any part of which is encompassed within the geographic boundaries corresponding to the shape drawn on the graphical image representation is included in a preferred cities list.

According to yet another aspect of the disclosed system and method, the end-user defines a preferred area that is not restricted to city boundaries. The end-user defines the boundaries of a shape overlaid on the graphical image representation of a geographic area. Thereafter, when the preferred area is used and the end-user operates the navigation system to provide a function, the function is limited to only those places, locations, and so on, that are within the geographic area corresponding to the defined shape.

In another aspect of the disclosed system and method, an end-user can define hierarchical preferred cities lists. According to this alternative embodiment, a first preferred cities list can include one or more other preferred cities lists or preferred areas as well as individually named cities. A first preferred cities list formed in this manner includes all the cities on the included preferred cities lists and in the included preferred areas as well as all the individually named cities.

DETAILED DESCRIPTION OF THE PRESENTLY PREFERRED EMBODIMENTS

A. FIRST EMBODIMENT

Overview.

Figure 2:
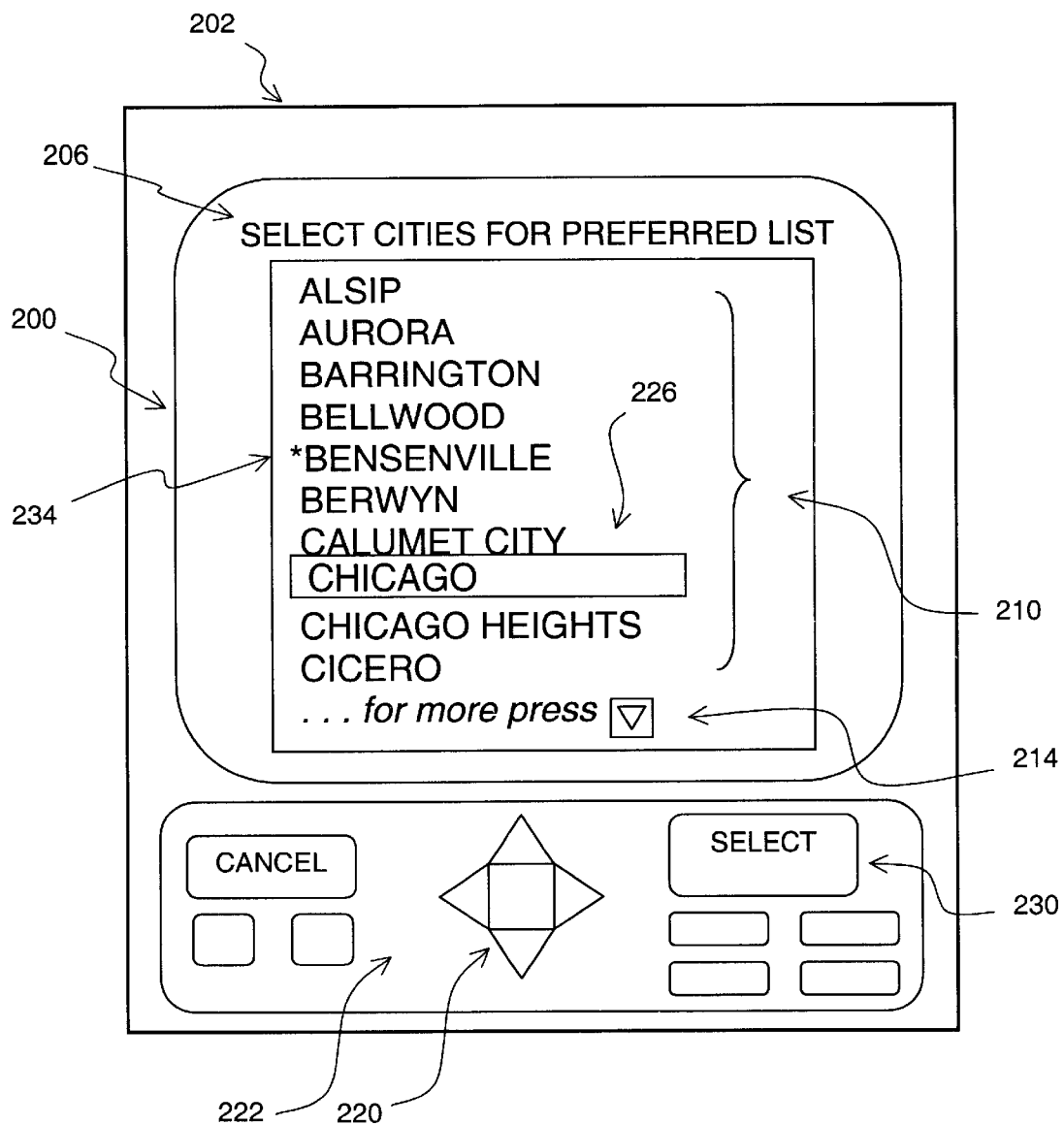
FIG. 2 is an illustration of a navigation system display showing a menu that provides for selection of cities for a preferred cities list according to a first embodiment of the present invention.

A first embodiment of the disclosed subject matter is described with reference to FIGS. 2–8. FIG. 2 shows a display 200 of a navigation system 202. The navigation system 202 is a combination of hardware and software components. The navigation system hardware may include one or more processors, memory, data storage, a user interface, and so on. The navigation system software includes the programming that provides for the functions and/or features performed by the navigation system 202. The navigation system programming may be stored in a non-volatile storage medium in the navigation system 202. Alternatively, some or all of the navigation programming may be located at a remote location and provided to or accessed by the navigation system 202 over a wireless communications system. In one embodiment, the navigation programming is written in the C programming language although in alternative embodiments other programming languages may be used, such as C++, Java, Visual Basic, and so on.

In order to provide navigation features to an end-user, the navigation system 202 uses geographic data. The geographic data may be organized into one or more geographic databases. The geographic data includes information about one or more geographic regions or coverage areas. The geographic data may be stored in the vehicle in which the navigation system is installed or alternatively, the geographic data may be stored remotely and made available to the navigation system 202 in the vehicle through a wireless communication system which may be part of the navigation system 202. In another alternative, a portion of the geographic data may be stored in the vehicle and a portion of the geographic data may be stored in a remote location and made available to the navigation system 202 in the vehicle over a wireless communication system from the remote location.

The navigation programming uses the geographic data in conjunction with input from the end-user via a user interface of the navigation system, and possibly in conjunction with outputs from a positioning system if available, to provide various features and/or functions. The screen displays shown in FIGS. 2–8 are rendered using appropriate routines included in the navigation programming. Likewise, the handling of user input in response to these screen displays is provided by appropriate routines included in the navigation programming.

In the embodiment shown in FIGS. 2–8, the navigation system 202 is installed in a vehicle, although in alternative embodiments, the navigation system 202 may be a portable (e.g., hand-held) unit. Alternatively, navigation systems may be implemented on other kinds of devices and platforms including devices and platforms that provide other kinds of functions. For example, a navigation system can be implemented by appropriate programming and hardware on a personal computer (e.g., notebook or desktop), a network (including wireless networks and the Internet), PalmPilot®-type devices, personal digital assistants, telephones, and so on. Navigation systems implemented on any of these other kinds of devices and platforms are understood to be encompassed within the scope of the disclosed subject matter.

Setting up a Preferred List.

Referring to FIG. 2, the display 200 shows a screen which is used by the end-user to make selections for a preferred cities list. The end-user operates appropriate controls to cause the navigation system to show the screen depicted in FIG. 2. On the display screen 200 is a message 206 requesting the end-user to select one or more cities for a preferred cities list. Also included on the display 200 is a list 210 of cities. The list 210 on the display 200 is only a partial list of all the cities about which information is included in the geographic database used by the navigation system 202. The display 200 also includes a message 214 indicating how the end-user can view lists of more cities from the geographic database from which selections of cities for the preferred cities can be made. In this example, the message 214 indicates that the end-user can operate a button 220 on an input panel 222 of the navigation system 202 in order to view screens with lists of more cities. (In the embodiments disclosed herein, the terms "city" or "cities" are used to refer to any kind of place or municipality, including but not limited to cities, towns, villages, hamlets, boroughs, states, counties, provinces, countries, townships, postal zones, area codes, neighborhoods, subdivisions, administrative areas, and so on.)

(The input panel 222 disclosed herein represents only one type of means of accepting end-user input. The present subject matter is not limited to any specific means by which end-user input can be accepted. Various kinds and combinations of buttons, toggles, switches, keys, keyboards, pointing devices, and so on, may be used. Also, the navigation system may use a touch screen as a means of accepting end-user input. Also, the means for accepting user end-input may be implemented wholly or partially with voice-activation or speech recognition hardware and/or software.)

The display 200 provides highlighting 226 associated with one of the cities in the partial list 210. If the end-user wishes to add the highlighted city to the list of preferred cities, the highlighted city can be selected by appropriate operation of the input panel 222. For example, in order to add the highlighted city to the list of preferred cities, the end-user may press the key 230 labeled "SELECT." After the SELECT key 230 has been pressed, the city is indicated on the display 200 as being selected. A city may be indicated as being selected by another type of highlighting. For example, the name of the city may be in a different color or an asterisk 234 may appear next to the selected city. Then, the end-user may add another city from the partial list 210 to the list of preferred cities. To add another city from the partial list 210 to the list of preferred cities, the end-user uses the button 220 to scroll the highlighting 226 up or down through the partial list 210. When the highlighting 226 is on the next city that the end-user wants to add to the list of preferred cities, the end-user presses the SELECT key 230 again.

If the end-user want to cancel a selection, he/she operates the input panel 222 to highlight the selection again. The selection can be canceled by pressing the SELECT key 230 again.

Figure 3:
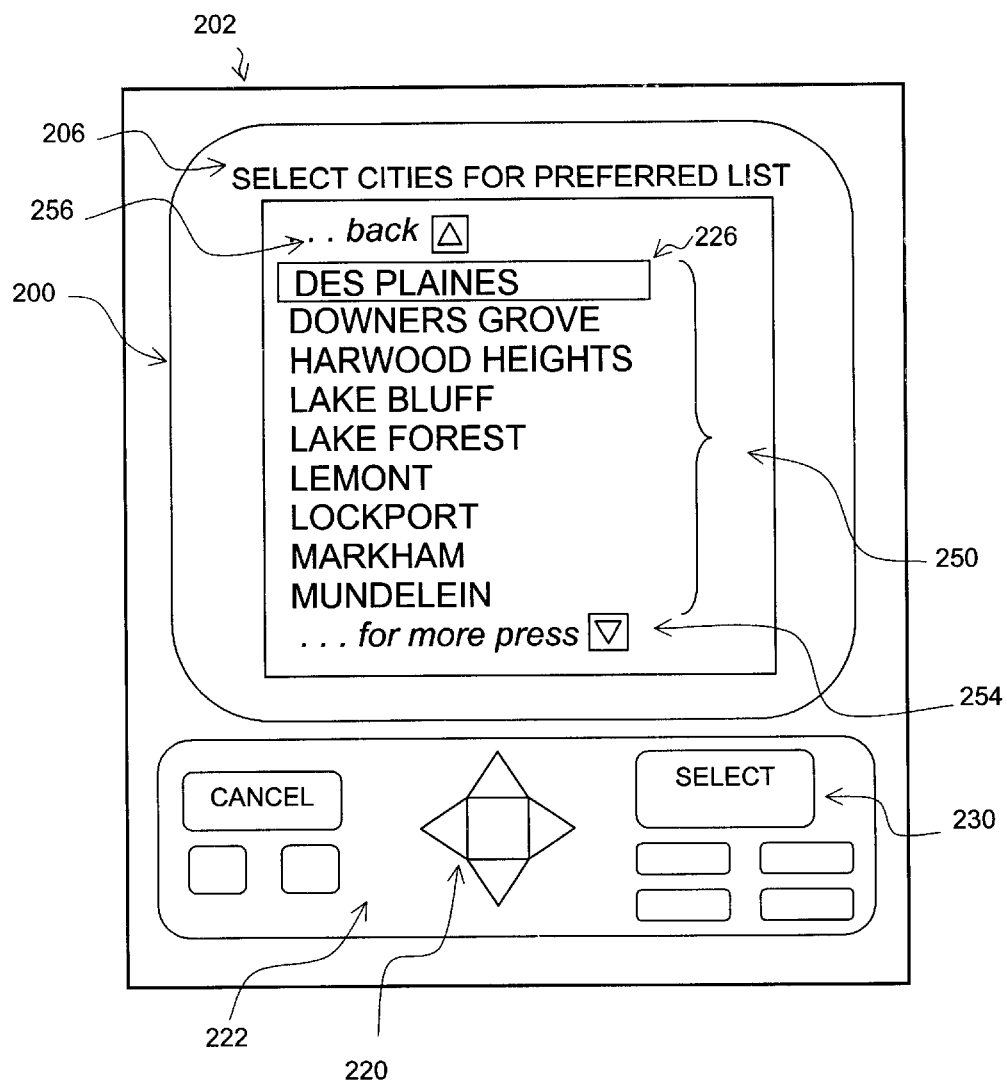
FIG. 3 is another illustration of the navigation system display of FIG. 2 showing another screen of names of cities presented for selection for the preferred cities list according to the first embodiment.

When the end-user does not want to add any more cities from the partial list 210 to the list of preferred cities (or if the end-user does not want to add any of the cities on the partial list 210), the end-user operates the input panel 222 to view screens with additional cities. As mentioned above, in the embodiment shown in FIG. 2, the display 200 includes a message 214 indicating to the end-user how to operate the input panel 222 to view screens with additional cities. Referring to FIG. 3, when the input panel 222 is operated in the appropriate manner, another list 250 of cities appears on the display 200. The list 250 is also a partial list of all the available cities from the geographic database used by the navigation system. This second list 250 is preferably also in alphabetical order and follows alphabetically after the first list 210 shown on the previous screen. Also on the display 200 with the second list 250 is the message 206 requesting selection of cities for the preferred cities list. One of the cities in the second list 250 has the highlighting 226. The screen shown in FIG. 3 includes messages 254 and 256 indicating to the end-user how to view the next partial list of cities and how to go back to the previous partial list of cities (shown in FIG. 2). The selection of one or more cities from the partial list 250 shown in FIG. 3 is similar to the process for selection of cities described above in connection with FIG. 2. The end-user may select one or more cities from the partial list 250 shown in FIG. 3 for the list of preferred cities, or may select none of the cities in the partial list 250. After the end-user is finished with the partial list 250 in FIG. 3, he/she operates the input panel 222 to view the next screen with the next partial list of cities or to go back to the previous screen with the previous partial list 210 of cities.

Figure 4:
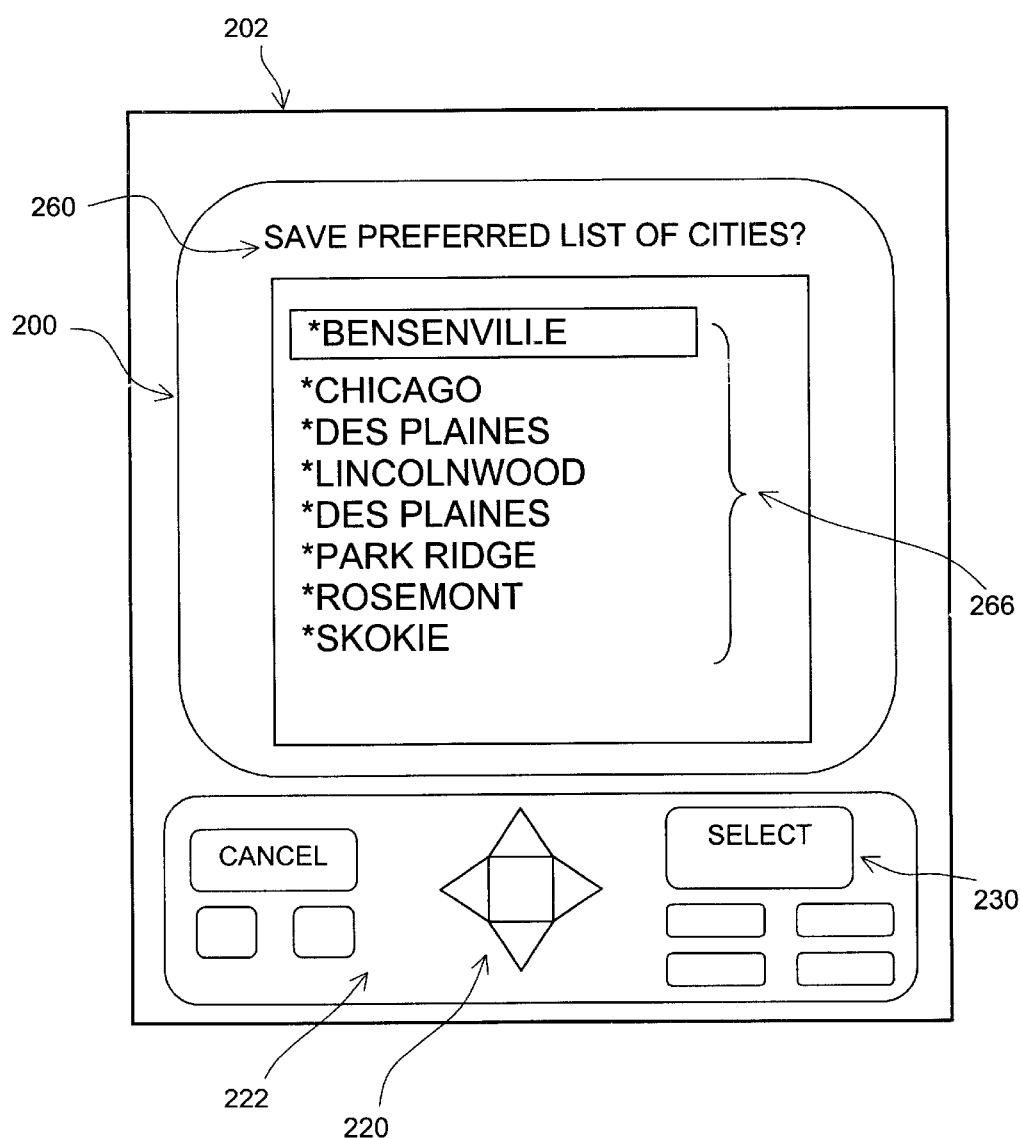
FIG. 4 is another illustration of the navigation system display of FIG. 2 showing a screen prompt for a step in the selection of cities for a preferred cities list according to the first embodiment.

When the end-user is finished making selections of cities for the preferred cities list, he/she operates the input panel 222 to indicate that he/she is finished. Referring to FIG. 4, when the end-user has indicated that selection of cities is complete, the display 200 presents a listing 266 of the cities selected by the end-user for inclusion in the list of preferred cities. (If the number of cities selected by the end-user for a preferred cities list exceeds the number of cities that can be shown on the display at one time, a message similar to the message 214 in FIG. 2 may be included.) At this stage, the end-user can delete any of the cities in the list 266. The end-user can also add additional cities to the list 266 by going back to the screens shown in FIGS. 2 and 3.

Figure 5:
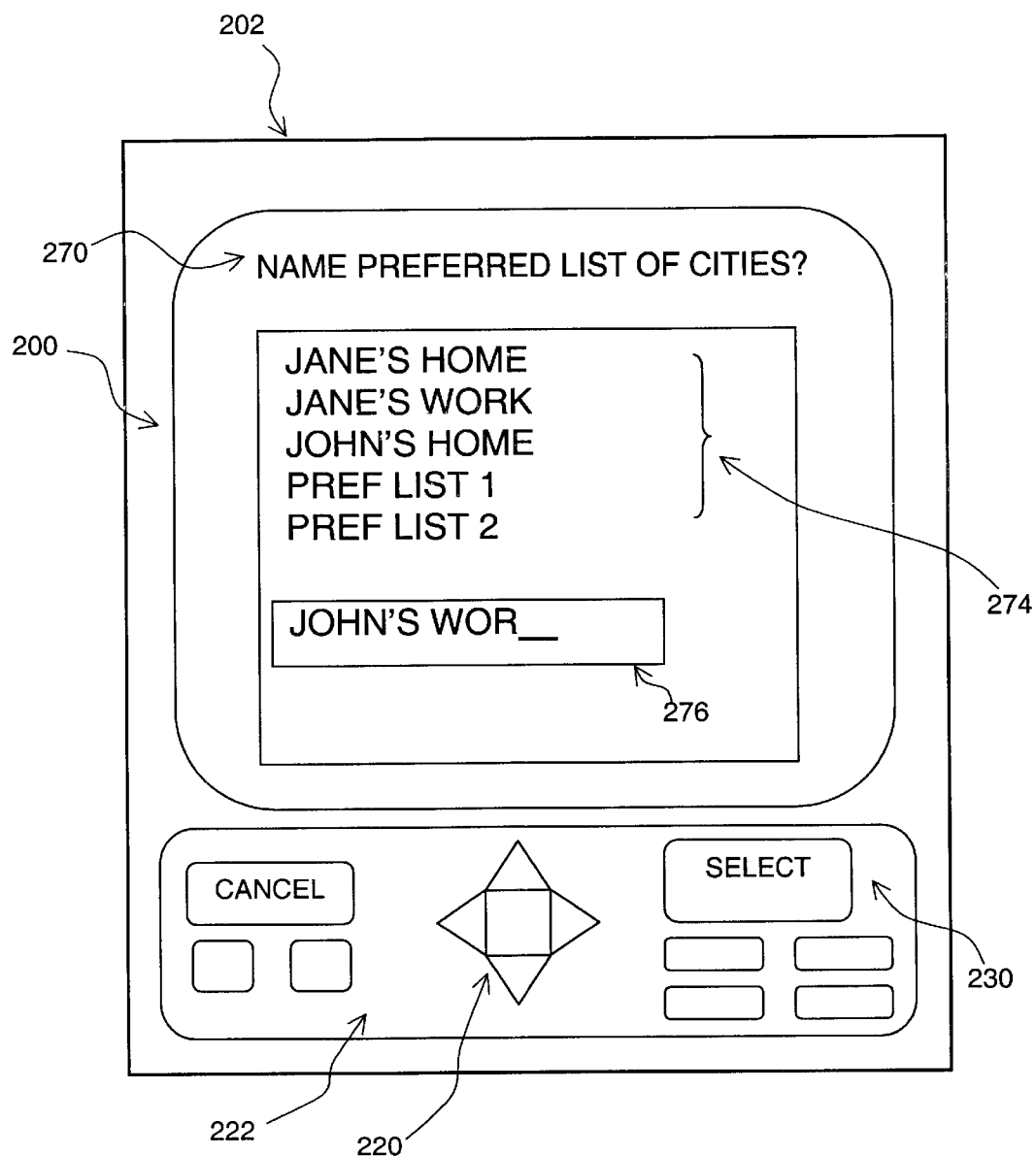
FIG. 5 is another illustration of the navigation system display of FIG. 2 showing an input screen for naming the list of preferred cities according to the first embodiment.
Figure 6:
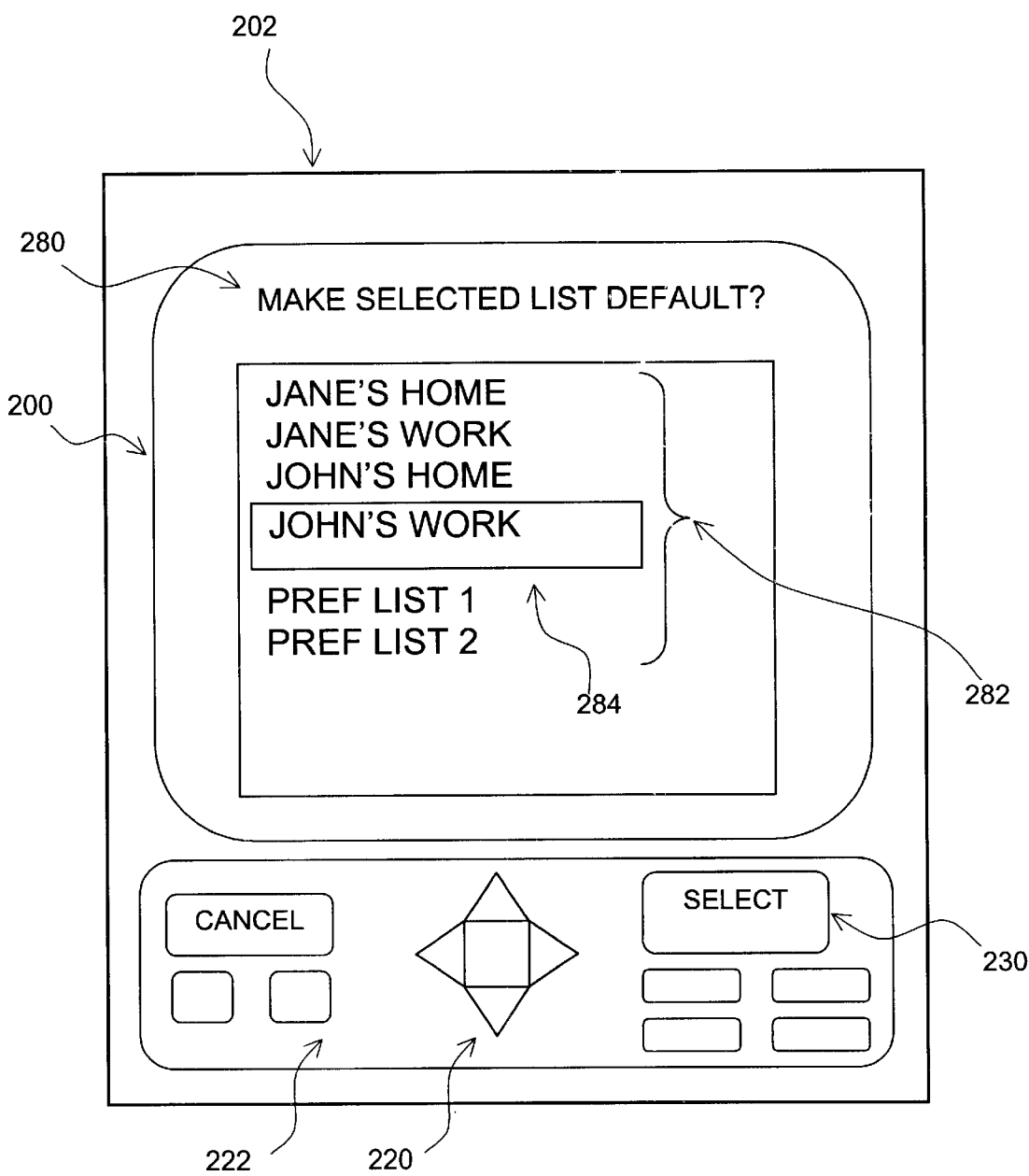
FIG. 6 is an illustration of the navigation system display of FIG. 2 showing a screen menu for selection of a preferred cities list according to the first embodiment.

Referring to FIG. 4, in addition to presenting the end-user with the list 266 of selected cities, the navigation system 202 also presents the end-user with a message 260 on the display 200. The message 260 requests the end-user to confirm that the list of preferred cities should be saved. If the end-user provides an affirmative response to the message 260 in FIG. 4, the end-user is presented with a screen like the one shown in FIG. 5. In FIG. 5, a message 270 is presented to the end-user that requests the end-user to assign a name to the list of preferred cities. The message 270 may be accompanied by a listing 274 of all the preferred cities lists that have previously been defined and saved. This listing 274 of the previously defined preferred cities lists identifies these lists by the names that had been assigned to them. The input panel 222 may be operated to define alphanumeric characters for naming the new list of preferred cities which had just been defined. The alphanumeric characters entered by the end-user when naming the preferred cities list are shown in a panel 276 on the display. For the convenience of the end-user, the navigation system may provide the end-user with default names (e.g., "PREF LIST 1", "PREF LIST 2", and so on). The end-user may rename these default named preferred lists at a later time, if desired. Any of the other preferred cities lists can also be renamed, if desired.

After the preferred cities list is named, the navigation system saves it in a non-volatile memory. Referring to FIG.

6, the navigation system presents a message 280 on the display 200. This message 280 asks whether the end-user wishes to make the new preferred cities list the default list. The new preferred cities list may be included in a list 282 that includes the other preferred cities lists. The new preferred cities list may be highlighted (e.g., with a box 284) so that the end-user can select either the new preferred cities list or one of the other previously defined preferred cities lists as the default, if desired. If the end-user replies affirmatively to the selection of the new preferred cities list as the default, the navigation system then automatically uses the new preferred cities list when performing certain functions, as explained further below. If a preferred cities list is not selected as a default, the navigation system does not automatically use any of the preferred cities lists. However, the preferred cities lists are still available and the end-user can have the navigation system use any of the preferred cities lists when performing a navigation function by appropriate operation of the input panel 222.

Operation.

Figure 1:
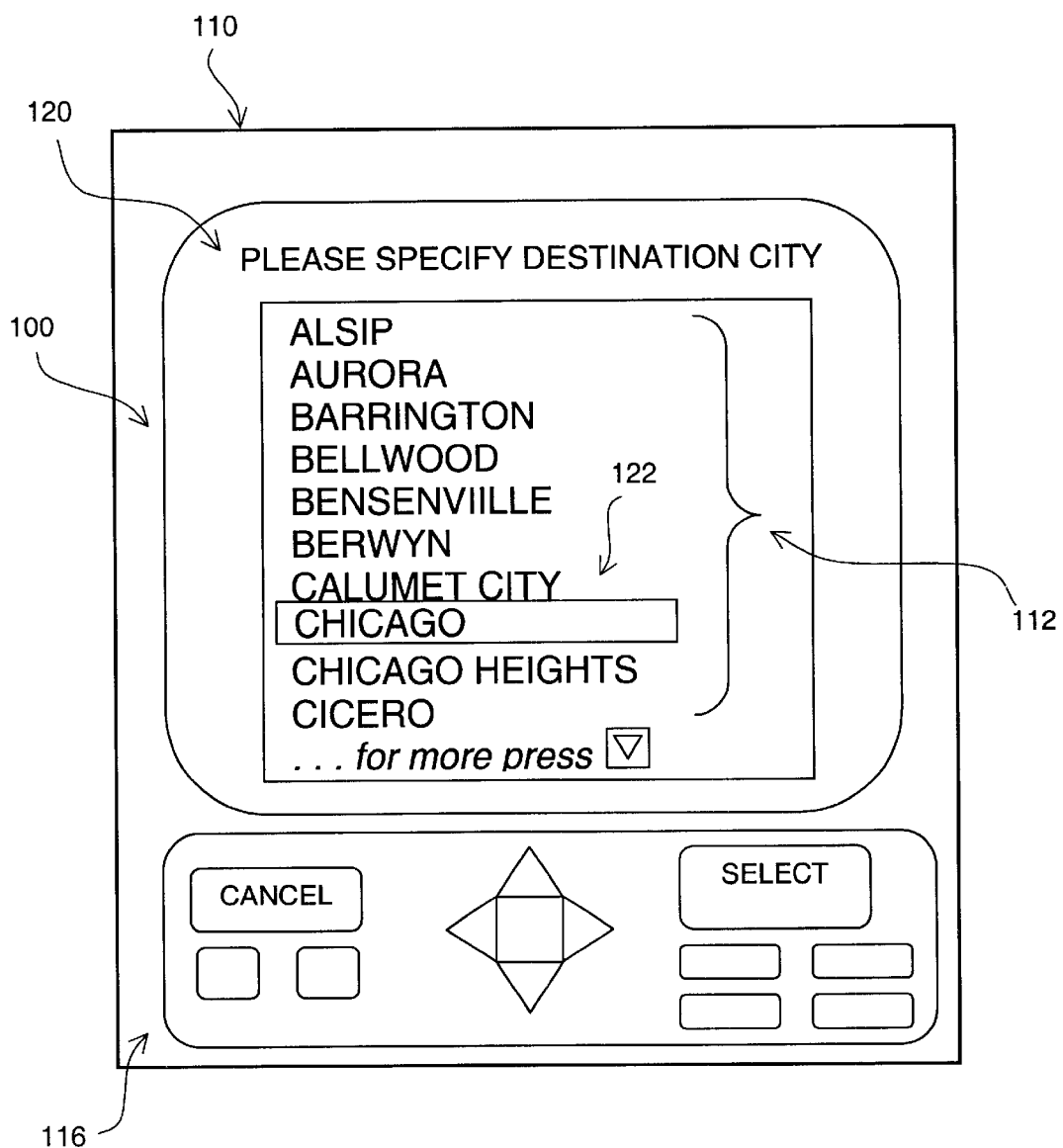
FIG. 1 is an illustration of a navigation system display showing a menu for selection of a destination city according to the prior art.

When a preferred cities list is in use (either because it has been selected as the default or because the end-user has indicated to the navigation system to use the preferred cities list for performing a specific function), the navigation system operates differently when performing certain functions compared to the navigation system described in connection with FIG. 1. When a preferred cities list is in use, the navigation system automatically uses the cities on the preferred cities list when performing certain functions. Operation of the navigation system when a preferred cities list is in use is explained in connection with the following examples.

EXAMPLE 1

Figure 7:
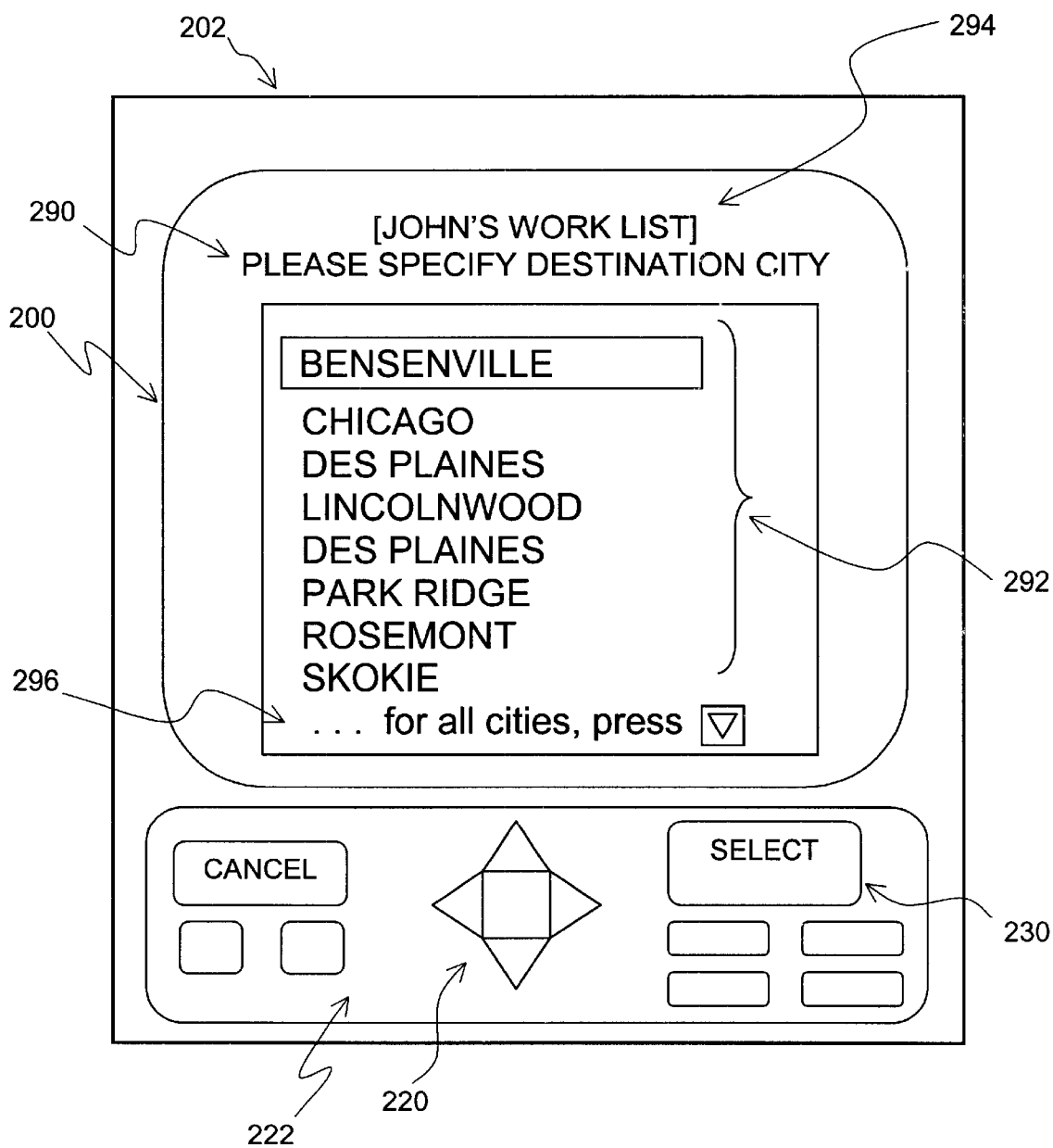
FIG. 7 is an illustration of the navigation system display of FIG. 2 showing a screen for selection of a destination city using a preferred cities list according to the first embodiment.

According to a first example, when a preferred cities list is in use, the navigation system automatically initially displays only the cities from the preferred cities list when searching for a destination city. FIG. 7 shows an example of the display 200 of the navigation system 202 when a preferred cities list is being used. When a preferred cities list is in use, the display 200 may include a message 294 indicating the name of the list that is in use. Also, the end-user is presented with a message 290 requesting selection of a city. The message 290 may be similar or identical to the message 120 in FIG. 1. A list 292 of cities is presented to the end-user. The cities on the list 292 are the cities from the preferred cities list that is in use. The preferred cities list may be used for any of the kinds of searches that can be performed with the navigation system, including searches for cities for address destinations and searches for destinations of a specific type. When the preferred cities list is in use the navigation system automatically initially presents only the cities on the preferred cities list.

When a preferred cities list is in use, even though only the cities on the preferred cities list are displayed initially, the end-user is provided with the option of expanding the search to include all the available cities. As shown in FIG. 7, a message 296 is presented on the display 200 to provide this option. If the end-user chooses to expand the search to include all available cities, the navigation system reverts to a conventional mode of operation and a screen like the one in FIG. 1 is presented to the end-user. After the option of searching all available cities is used, subsequent uses of the navigation system for new functions will default back to using the preferred cities list again.

EXAMPLE 2

According to another example, when a preferred cities list is in use, the navigation system operates differently when the end-user spells the name of a desired destination city using keys on the input panel. As mentioned above, some navigation system facilitate the process of spelling the name of a city by displaying a listing of all the matching city names as each character is entered by the end-user. When a preferred cities list is in use, the names of cities that are displayed when characters are entered are restricted initially to only those on the preferred cities list. This reduces the number of possible matches thereby potentially causing the desired city to be displayed more quickly, i.e., with the end-user having to enter fewer characters. If the desired city is not on the preferred cities list in use, the end-user is provided with the option to search the entire database for the desired city.

EXAMPLE 3

In another alternative method of operation, the navigation system automatically selects a destination from the preferred cities list in use as soon as the end-user has entered sufficient information to resolve any ambiguities regarding the desired destination. For example, if a preferred cities list is in use and the end-user wants a route calculated to a given address along a street, the navigation system provides an input screen prompting the end-user to enter an address number, a street name, and city name. The end-user uses the input panel to enter the address number and the street name. After the end-user has entered the address number and the street name, the navigation system searches the names of the cities on the preferred cities list to determine which, if any, of the cities has a street with the name entered by the end-user and with an address range that encompasses the address number entered by the end-user. If only one of the cities on the preferred cities list has a street with the street name and address number entered by the end-user, the navigation system automatically selects the city and begins calculating a route to the destination. The navigation system displays the selected city name in order to allow the end user to cancel the selection if the city is not the one desired by the end-user. If the end-user cancels the selection, the navigation system allows the end-user to select a city name from outside the preferred cities list. If more than one city on the preferred cities list includes a street with the name and address entered by the end-user, the navigation system displays the names of all the possible cities from the preferred cities list that include the street name and address number entered by the end-user. The navigation system then prompts the end-user to select one of the cities, or to select a city from outside the preferred cities list.

Using a preferred cities list in the manner described above facilitates certain types of searches for end-users. For example, using a navigation system to search for some addresses, e.g. "100 MAIN STREET", might be difficult because many cities represented in a geographic database have streets named "MAIN" and therefore the search results might be relatively large. However, by restricting the cities being searched to only those on a preferred cities list, a more manageable set of search results is produced, thereby facilitating use of the navigation system.

This feature can be used with other kinds of searches that can be performed by the navigation system. For example, some navigation systems allow an end-user to search for a destination by point-of-interest name and city name, or by point-of-interest name, street name, and city name. Again, when a preferred cities list is in use and the end-user enters sufficient information, such as the point-of-interest name or the point-of-interest name and the street name, the navigation system automatically displays a list of the one or more cities from the preferred cities list in which the point-of-interest is located. If only one city on the preferred cities list includes the named point of interest or the named point of interest on the named street, the navigation system automatically selects the city and begins calculating a route to the point of interest in the selected city while providing the end-user with the option to cancel the selection. Similarly, some navigation systems allow an end-user to search for a destination by a street intersection and city. When the end-user has entered the names of the intersecting streets, the navigation system automatically displays a list of the one or more cities from the preferred cities list that include intersecting streets having those names. If only one city on the preferred cities list includes the named intersecting streets, the navigation system automatically selects the city and begins calculating a route to the intersecting streets in the selected city while providing the end-user with the option to cancel the selection.

Handling Multiple Preferred Lists.

Figure 8:
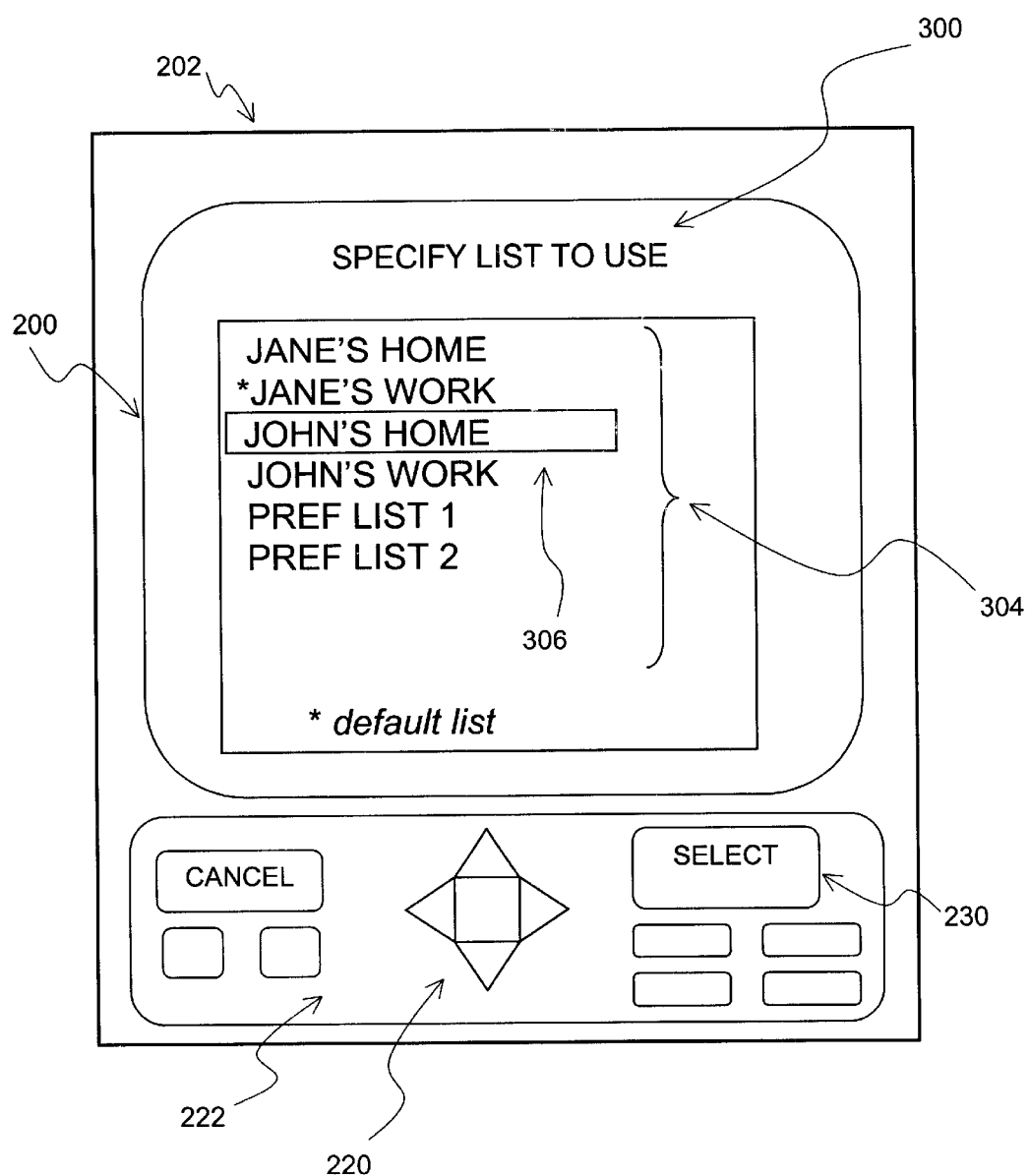
FIG. 8 is an illustration of the navigation system display of FIG. 2 showing a screen presented to the end-user at start up for selection of a preferred cities list to use during operation of the navigation system according to the first embodiment.

When more than one preferred cities list has been defined, a selection is made of how the preferred cities lists should be used by the navigation system. There are several ways that multiple preferred cities lists can be used. One way to select which of the preferred cities lists to use is illustrated in FIG. 8. FIG. 8 shows the display 200 of the navigation system 202 with a message 300. The navigation system is configured to show the message 300 when the vehicle is started up. The message 300 requests that the end-user select one of the preferred cities lists for use. Also presented on the display is a list 304 that includes all the preferred cities lists that have been saved. In one embodiment, the last preferred cities list to have been used is highlighted (e.g., with a box 306). If one of the lists has been selected as the default list, an appropriate indication may be displayed. The end-user selects one of the preferred cities lists from the list 304. The navigation system then uses the selected preferred cities list until the vehicle is started again (at which time the message 300 and list 304 are presented again), or until the end-user selects a different preferred cities list by accessing the message 300 and list 304 through a menu of the navigation system.

Another way to select which preferred cities list to use is to associate different lists with different drivers. For example, assume a first driver (e.g., Jane) defines a preferred cities list named "JANE'S LIST" and a second driver (e.g., John) defines another preferred cities list named "JOHN'S LIST." Then, whenever the first driver starts the vehicle, the navigation system automatically selects "JANE'S LIST" and whenever the second driver starts the vehicle, the navigation system automatically uses "JOHN'S LIST." Which driver starts the vehicle can be determined by various means, such as personalized ignition keys, personalized entry or access codes, driver's seat positions, and so on.

Another way to select which preferred cities list to use is to associate different lists with different areas. For example, assume that a driver defines a first preferred cities list, named "JANE'S WORK LIST," for business use and a second preferred cities list, named "JANE'S HOME LIST," for non-business use. Then, when the vehicle is located closer to the driver's home, the navigation system automatically uses "JANE'S HOME LIST" and when the vehicle is closer to the driver's place of work, the navigation system automatically uses "JANE'S WORK LIST." The vehicle location can be determined by a positioning system that may be part of the navigation system. This way of using multiple preferred lists can be extended to more than two locations.

Still another way to use the preferred cities lists is to use two or more of the preferred cities lists consecutively when performing a search. For example, using the preferred cities lists named in FIG. 5, the navigation system may first present the end-user with the cities in "JOHN'S WORK" list, then the cities in "JANE'S WORK" list, then the cities in "JOHN'S HOME" list, and so on. The order in which the multiple lists are used, as well which of the available lists are used in this manner for consecutive presentation, may be selected by the end-user using an appropriate setup menu screen.

Alternatives.

The end-user is not limited to identifying only cities on a preferred list. Alternatively, the end-user may identify other kinds of places, such as states, counties, provinces, countries, townships, postal zones, area codes, neighborhoods, subdivisions, administrative areas, and so on. In one embodiment, the kinds of places that the end-user can identify are those defined in the geographic database used by the navigation system. In alternative embodiments, the kinds of places that the end-user can identify are not limited to only those included in the geographic database.

Any other suitable terminology may be used to refer to a "preferred cities list." For example, the list formed by the end-user's selections may be referred to as a "preferred places list."

B. SECOND EMBODIMENT

Figure 9:
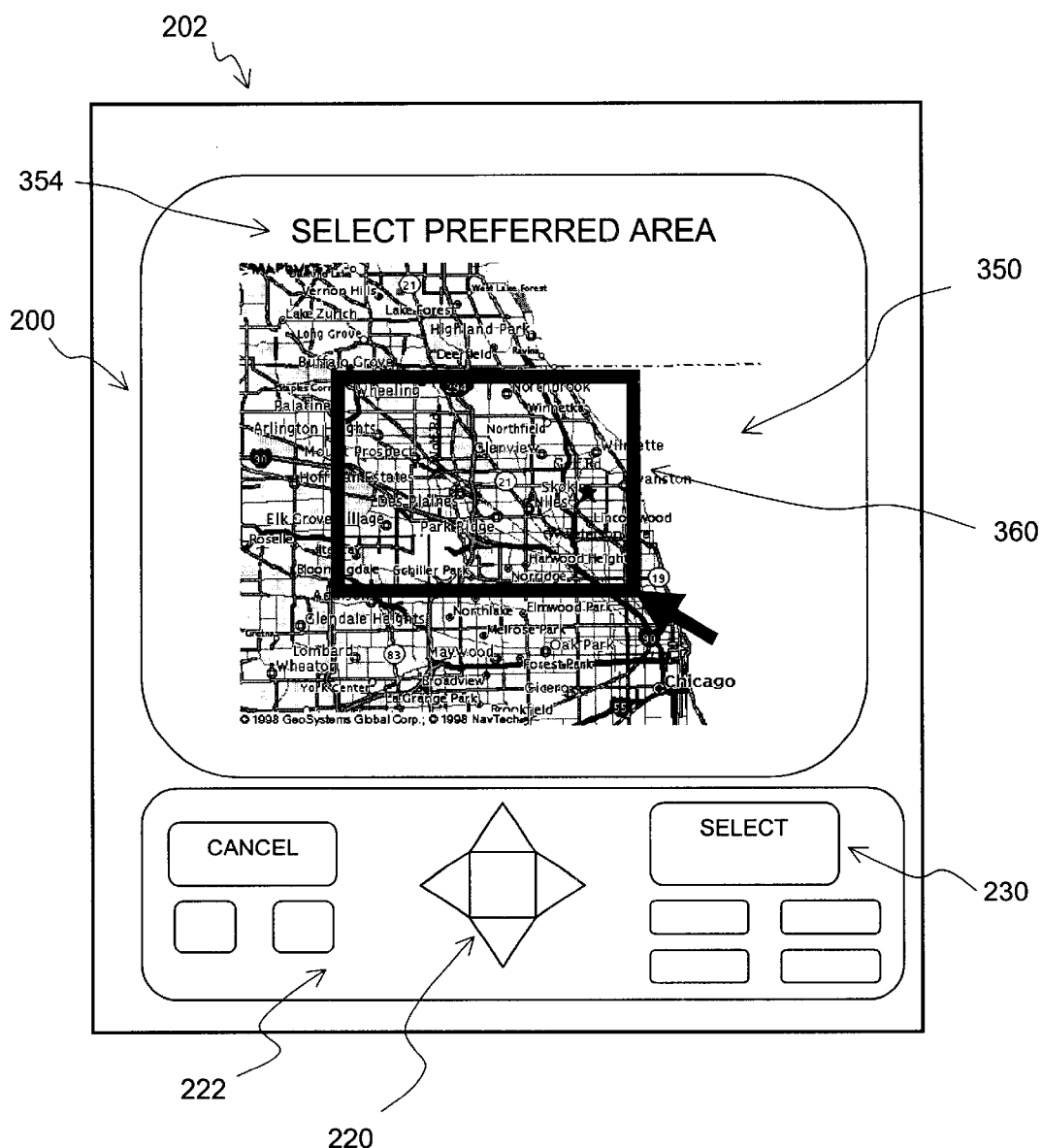
FIG. 9 is an illustration of the navigation system display of FIG. 2 showing an input screen for selection of cities for a preferred city list according to a second embodiment.
Figure 10:
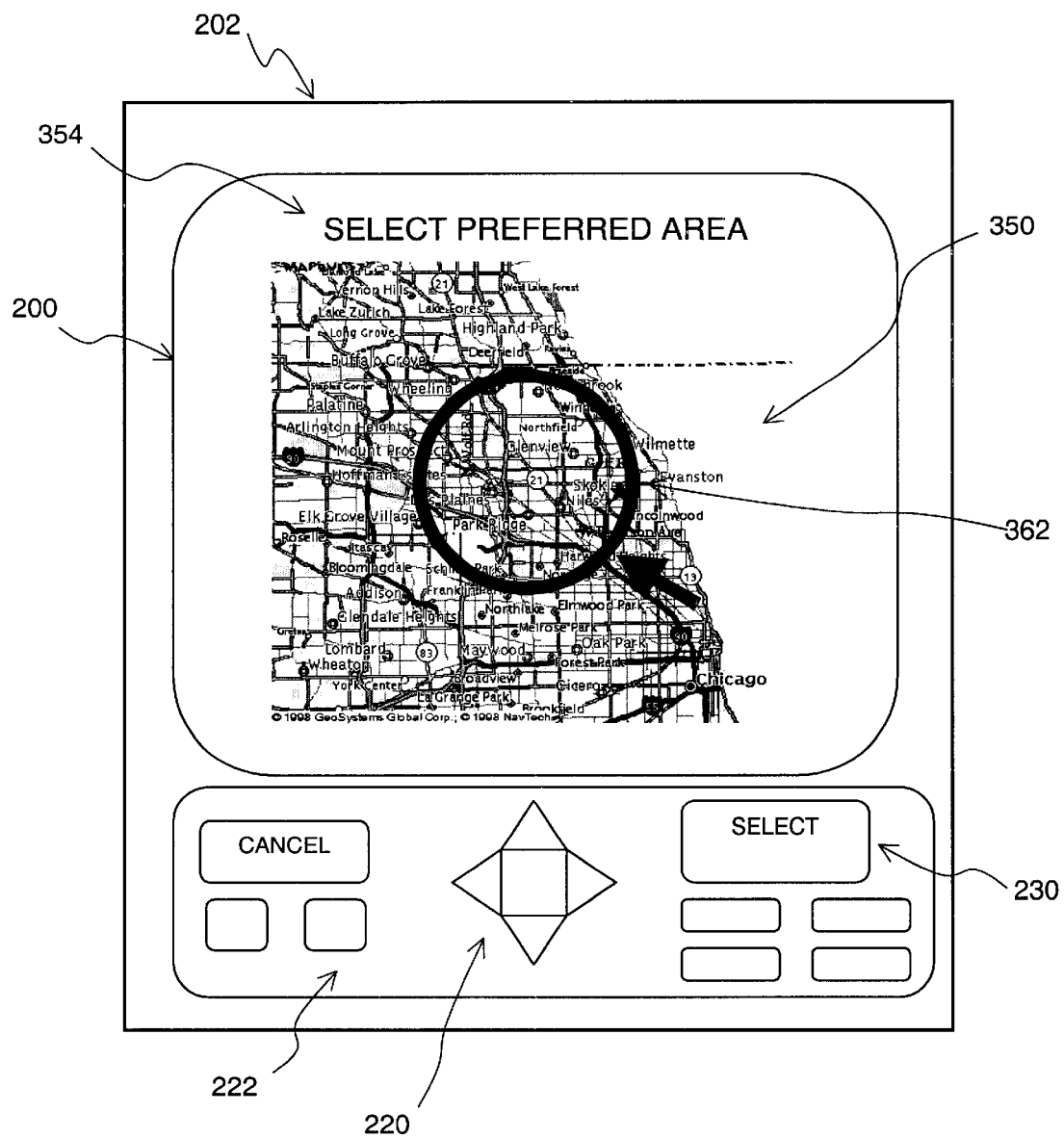
FIG. 10 is an illustration similar to FIG. 10 showing an alternative way to select cities for a preferred cities list according to the second embodiment.

FIGS. 9 and 10 show another way to form a preferred list. In FIGS. 9 and 10, the display 200 of the navigation system 202 shows a map image 350. The map image 350 represents part of the geographic region covered by the geographic database used with the navigation system 202. Also shown on the display 200 is a message 354. The message 354 requests the end-user to define a preferred area. Using the input panel 222, the end-user defines a preferred area on the map image 350. The preferred area is defined graphically by adjusting a shape overlaid on the map image 350. The preferred area may be defined using any shape. In FIG. 9, a bordered rectangular box 360 is used to define a preferred area with a rectangular shape and in FIG. 10 a bordered circle 362 is used to define a preferred area with a circular shape. In alternative embodiments, other shapes can be drawn and used, including irregular shapes. The bordered rectangular box 360 in FIG. 9 and the bordered circle 362 in FIG. 10 are rendered by appropriate programming in the navigation system. (Aside from the shape, the selection of preferred cities is similar with the embodiments shown in FIGS. 9 and 10. The discussion below relative to FIG. 9 applies as well to the circular embodiment of FIG. 10.)

Referring to FIG. 9, the size and location of the box 360 relative to the map image 350 can be adjusted by the end-user using the input panel 222. Using the input panel 222, the end-user positions and sizes the box 360 over the area on the map image from which the end-user wishes the cities for the selected cities list to be chosen. When the end-user has positioned the box 360 over the area from which he/she wishes the cities for the selected cities list to be chosen, the end-user indicates that selection is complete. Then, the navigation system identifies all the cities any part of which are encompassed within the boundaries of the geographic area corresponding to the selection box 360. The navigation system uses the geographic database for this purpose. All of the cities that are identified as having any portion within the geographic area corresponding to the box 360 are used to form a preferred cities list. The preferred cities list may be named and used by the navigation system in the same or similar manner as described above in connection with the first embodiment. As with the previous embodiment, the end-user has the option of accessing the list of all cities in the database, if desired, in connection with the performance of any function by the navigation system.

C. THIRD EMBODIMENT

Another way to make a navigation system easier to use is to define a preferred area. A preferred area is similar to the preferred cities list described above. When a preferred area is in use, certain navigation system functions operate differently compared to the navigation system described in FIG. 1. For example, when a preferred area is in use, searches performed by the navigation system are initially limited to only the area within the boundaries defined for the preferred area. For example, if the end-user is prompted by the navigation system to select a city, only those cities that are located within the preferred area—in whole or in part— are presented to the end-user. However, if a city is divided by a boundary of the preferred area, only the portions of the city that are located inside the boundary of the preferred area are used. Portions of cities that are outside the boundary of the preferred area are excluded. As with the previous embodiments, the end-user has the option of extending the navigation functions to access locations outside the preferred area, if desired.

When a preferred area is in use, searches for locations by type also operate in a modified way. For example, assume that a preferred area is defined using a selection shape that completely encompasses the entire community of Park Ridge, Ill., but only the northwest side of Chicago. If this preferred area is in use when searching for a location by type (e.g., Chinese restaurants), only those locations that match the type and that are either in Park Ridge or on the northwest side of Chicago appear in the search results (e.g., only Chinese restaurants that are in Park Ridge or that are on the northwest side of Chicago).

A preferred area can be defined using the same method described above in connection with FIGS. 9 and 10. A map image is displayed on the display of the navigation system and the end-user uses the input panel to draw a shape overlaid on the map image. The navigation programming then defines a preferred area corresponding to the area encompassed within the shape on the map image. Again, the navigation system programming identifies the cities or places any part of which are encompassed within the boundaries of a geographic area corresponding to the box 360. However, when forming a preferred area, only those portions of the cities or places that are encompassed within the box 360 are included. If a portion of a city or place is inside the selected area and another portion of the same city or place is outside the selected area, only the portion of the city or place inside the selected area forms part of the preferred area.

The preferred area may be named by the navigation system in the same or similar manner as described above in connection with the first embodiment. When a preferred area is formed, a different name may be used in order to distinguish it from a preferred cities list. For example, when a preferred area is formed, it may be referred to as an "area" instead of a "list." Examples include "JOHN'S LIST" and "JOHN'S AREA."

The preferred area may be used by the navigation system in the same or similar manner as described above in connection with the first embodiment. For example, a preferred area may be used in conjunction with a preferred cities list in any of the ways described above in connection with multiple preferred lists.

D. FOURTH EMBODIMENT

In another embodiment, preferred cities lists and preferred areas can be used to form hierarchical preferred lists. According to this alternative, one or more preferred cities lists and/or preferred areas are defined according to any of the embodiments described above. Then, a hierarchically higher layer preferred list is formed. When forming a hierarchically higher layer preferred list, one or more of the already defined preferred cities lists and/or preferred areas are selected for inclusion in the hierarchically higher layer preferred list. These preferred cities lists may be selected in the same manner as individual cities are selected for forming preferred list according to the previously described embodiments. A hierarchically higher layer list may also include individual city names. Thus, a hierarchically higher layer list may include any combination of one or more preferred cities lists, preferred areas, or individual cities. For example, a hierarchically higher layer preferred list called "JOHN'S MASTER" list can include "JOHN'S WORK" list, "JOHN'S HOME" list, and "JOHN'S AREA" as well as the individually named cities of Waukegan and Lake Forest, Ill.

A hierarchically higher layer list formed this way is used in the same manner as the lists formed according to the embodiments described above. When a hierarchically higher layer list is used by the navigation system, all the cities included in any of the preferred cities lists included in the hierarchically higher layer list are treated as included in the hierarchically higher layer. Similarly, a hierarchically higher layer preferred list that includes a preferred area is treated as including all the streets, locations, and points of interest in the preferred area. Thus, when a navigation system uses a hierarchically higher layer list, certain functions, such as searches, are initially restricted to the places individually listed on the hierarchically higher layer list and the places and areas included in any of the hierarchically lower layer preferred lists included in the hierarchically higher layer list.

It is intended that the foregoing detailed description be regarded as illustrative rather than limiting and that it is understood that the following claims including all equivalents are intended to define the scope of the invention.

I claim:

1. In a navigation system that includes a geographic database that contains data that represent roads and cities in a geographic area, navigation programming that includes a route guidance function that uses the geographic database to provide instructions to a user of the navigation system for traveling to a destination selected by the user, and a user interface by which the user selects a location as the destination, an improvement comprising:

a program run on said navigation system that uses a display screen of the navigation system to present to the user an alphabetical listing of all the cities represented by the data in the geographic database, presents the user with an instruction to select as preferred cities at least one of the cities presented to the user on the display screen, accepts selections by the user from said alphabetical listing of cities to designate as the preferred cities, stores the selections by the user in a memory of the navigation system, thereafter modifies operation of the user interface so that the user is presented with a list of the preferred cities when using the user interface to select a city in which a desired destination is located, accepts a selection by the user from said list of preferred cities to indicate the city in which the desired destination is located, and accepts from the user an indication of a specific address in the selected city as being the desired destination.

2. The invention of claim 1 wherein said cities include towns, villages, hamlets, boroughs, states, counties, provinces, countries, townships, postal zones, area codes, neighborhoods, subdivisions, and administrative areas.

3. The invention of claim 1 wherein said program modifies operation of the user interface so that the user is presented with an option to be presented with all the cities represented by the data in the geographic database after being presented with just the preferred cities when using the user interface to select the city in which the destination is located.

4. The invention of claim 1 wherein said navigation system is installed in a vehicle.

5. The invention of claim 1 wherein said program allows the user to store multiple lists of preferred cities.

6. The invention of claim 5 wherein said program allows the user to assign names to each of said multiple lists of preferred cities.

7. The invention of claim 5 wherein said program allows the user to make one of said multiple lists of preferred cities a preferred city on another of said multiple lists of preferred cities.

8. The invention of claim 1 wherein said navigation programming is located remote from the user and accessed by the user over a wireless communications system.

9. The invention of claim 1 wherein at least a portion of said geographic database is located remote from the user and accessed by the user over a wireless communications system.

10. The invention of claim 1 wherein said navigation system is implemented on a personal digital assistant.

11. In a navigation system that includes a geographic database that contains data that represent roads and cities in a geographic area, navigation programming that includes a route guidance function that uses the geographic database to provide instructions to a user of the navigation system for traveling to a destination selected by the user, and a user interface by which the user selects a location to correspond to the destination, an improvement comprising:

a program run on said navigation system that uses a display screen of the navigation system to present the user with a graphical map that shows places represented by the data in said geographic database, presents the user with an instruction to select as preferred places at least one of the places presented on the graphical map, accepts selections by the user from the places presented on the display screen to designate as preferred places, stores the selections by the user in a memory of the navigation system, thereafter modifies operation of the user interface so that the user is presented with a list of the preferred places when using the user interface to select a place in which a desired destination is located, accepts a selection by the user from said list of preferred places to designate a place in which the desired destination is located, and accepts from the user an indication of a specific address in the selected place as being the desired destination.

12. The invention of claim 11 wherein said places include cities, towns, villages, hamlets, boroughs, states, counties, provinces, countries, townships, postal zones, area codes, neighborhoods, subdivisions, and administrative areas.

13. The invention of claim 11 wherein said program modifies operation of the user interface so that the user is presented with an option to be presented with all the places represented by the data in the geographic database after being presented with just the preferred places when using the user interface to select the place in which the desired destination is located.

14. The invention of claim 11 wherein said navigation system is installed in a vehicle.

15. The invention of claim 11 wherein said program allows the user to store multiple lists of preferred places.

16. The invention of claim 15 wherein said program allows the user to assign names to each of said multiple lists of preferred places.

17. The invention of claim 15 wherein said program allows the user to make one of said multiple lists of preferred places a preferred place on another of said multiple lists of preferred places.

18. The invention of claim 11 wherein said navigation programming is located remote from the user and accessed by the user over a wireless communications system.

19. The invention of claim 11 wherein at least a portion of said geographic database is located remote from the user and accessed by the user over a wireless communications system.

20. The invention of claim 11 wherein said navigation system is implemented on a personal digital assistant.

21. The invention of claim 11 wherein said preferred places include geographical areas corresponding to user-defined shapes on the graphical map.

* * * * *